US009613382B1

(12) United States Patent
Newstadt et al.

(10) Patent No.: US 9,613,382 B1
(45) Date of Patent: Apr. 4, 2017

(54) SYSTEMS AND METHODS FOR AUTOMATICALLY SYNCHRONIZING ONLINE COMMUNITIES

(75) Inventors: Keith Newstadt, Newton, MA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1674 days.

(21) Appl. No.: 11/956,016

(22) Filed: Dec. 13, 2007

(51) Int. Cl.
| | |
|---|---|
| *G06Q 50/00* | (2012.01) |
| *G06Q 10/10* | (2012.01) |
| *G06Q 90/00* | (2006.01) |
| *G06Q 99/00* | (2006.01) |
| *G06F 7/06* | (2006.01) |
| *G06F 7/22* | (2006.01) |
| *G06F 17/30* | (2006.01) |

(52) U.S. Cl.
CPC ............ *G06Q 50/01* (2013.01); *G06F 7/06* (2013.01); *G06F 7/22* (2013.01); *G06F 17/30* (2013.01); *G06Q 10/10* (2013.01); *G06Q 90/00* (2013.01); *G06Q 99/00* (2013.01)

(58) Field of Classification Search
CPC ........ G06Q 50/01; G06Q 10/10; G06Q 90/00; G06Q 99/00; G06F 7/06; G06F 7/22; G06F 17/30
USPC ........................................................ 709/248
See application file for complete search history.

(56) References Cited

U.S. PATENT DOCUMENTS

| | | | |
|---|---|---|---|
| 7,237,201 B2 | 6/2007 | Fish | |
| 7,428,750 B1 * | 9/2008 | Dunn et al. ....................... 726/8 |
| 7,673,327 B1 | 3/2010 | Polis et al. | |
| 7,849,496 B2 * | 12/2010 | Ahern et al. ....................... 726/1 |
| 7,904,558 B2 * | 3/2011 | Malik ............................ 709/206 |
| 8,079,911 B2 * | 12/2011 | Fowler et al. .................... 463/43 |
| 8,578,009 B1 * | 11/2013 | Newstadt ............. G06Q 10/107 709/206 |
| 2002/0032576 A1 * | 3/2002 | Abbott et al. ..................... 705/1 |
| 2004/0254991 A1 * | 12/2004 | Malik et al. ................... 709/206 |
| 2005/0027817 A1 * | 2/2005 | Novik et al. ................... 709/217 |
| 2007/0203954 A1 * | 8/2007 | Vargas et al. ................. 707/201 |
| 2007/0226304 A1 * | 9/2007 | Virk et al. ..................... 709/206 |
| 2007/0293212 A1 * | 12/2007 | Quon et al. ................... 455/420 |
| 2008/0134295 A1 | 6/2008 | Bailey et al. | |
| 2008/0242277 A1 * | 10/2008 | Chen ....................... G06Q 10/10 455/414.2 |
| 2008/0244020 A1 * | 10/2008 | Dolan ........................... 709/206 |
| 2008/0261569 A1 * | 10/2008 | Britt et al. ..................... 715/841 |

(Continued)

OTHER PUBLICATIONS

Non-Final Office Action Received in Related U.S. Appl. No. 11/960,402; Sep. 30, 2009.

(Continued)

*Primary Examiner* — Patrice Winder
*Assistant Examiner* — Angela Widhalm De Rodrig
(74) *Attorney, Agent, or Firm* — FisherBroyles LLP

(57) ABSTRACT

A computer-implemented method for automatically synchronizing online communities may comprise identifying login information for a first user account associated with the first online community, accessing the first user account using the login information for the first user account, obtaining information from the first user account, and modifying, based on the information obtained from the first user account, a second user account associated with a second online community. Corresponding systems and computer-readable media are also disclosed.

17 Claims, 10 Drawing Sheets

(56) References Cited

U.S. PATENT DOCUMENTS

2009/0006202 A1   1/2009  Alroy
2009/0055404 A1*  2/2009  Heiden et al. .................. 707/10
2009/0138335 A1*  5/2009  Lieberman ......... G06Q 30/0204
                                                             705/7.33
2009/0138562 A1*  5/2009  Schmulen et al. ............ 709/206

OTHER PUBLICATIONS

Final Office Action Received in Related U.S. Appl. No. 11/960,402; Feb. 19, 2010.
Non-Final Office Action received in U.S. Appl. No. 11/960,402, dated Jan. 19, 2012.

\* cited by examiner

SYSTEMS AND METHODS FOR AUTOMATICALLY SYNCHRONIZING ONLINE COMMUNITIES

BACKGROUND

Over the years, the popularity of online communities, such as social and professional-networking websites, messages boards, and peer-to-peer communities, has grown dramatically. In addition to providing other services, online communities may provide users with a platform to interact with and meet other users or further career-related pursuits. For example, users of social-networking sites, such as MYSPACE and FACEBOOK, may create and expand a personal network of friends by locating and connecting with old friends or by discovering and inviting new friends to join their personal network. Similarly, users of professional-networking sites, such as LINKEDIN, may extend their professional network of business or career-related contacts by locating and inviting other users to join their professional network.

While online communities provide many useful services to their members, the increasing number and types of online communities available to a single user may prove problematic. For example, a user may spend extensive time and effort creating and managing a first online community, only to find that they must repeat the same process again upon joining a second online community. Moreover, even if a user expends the time and effort required to create multiple online communities, an even greater amount of time and effort may be required to keep each of these online communities synchronized and up-to-date.

SUMMARY

As detailed above, users may benefit from systems and methods for automatically creating, updating, or synchronizing online communities. Accordingly, as will be described in greater detail below, various embodiments of the instant disclosure may enable users to build or automatically update a second online community based on information or data obtained from a first online community. For example, in one embodiment a computer-implemented method for automatically synchronizing online communities may comprise accessing a first online community, obtaining information from the first online community, and modifying, based on the information obtained from the first online community, a second online community. Likewise, the method may comprise obtaining information from the second online community and then modifying, based on the information obtained from the second online community, the first online community.

The method may also comprise either receiving login information for an online community from a user or retrieving login information for an online community from a login-information database and then using that login information to log into and access the online community. In one embodiment, online communities may be accessed using community-specific access modules or plug-ins that may be tailored to specific online communities.

Data or information may be obtained from online communities in a variety of ways; including, for example, by extracting human-readable data from an online community (e.g., screen scraping data from a display output of an online community) or by receiving computer-readable data from an online community. The information or data obtained from these online communities may represent user-account data for a user or contact information for family members, friends, or acquaintances of a user.

In certain embodiments, an online community may be modified by creating, editing, or deleting contact records in the online community based on information obtained from an additional online community. Alternatively, modifying an online community may represent creating a new online community based on information obtained from an existing online community. In each embodiment, invitations to join the new or modified online community may be sent to contacts via the new or modified online community. In one embodiment, these invitations may be sent by accessing the new or modified online community using community-specific access modules or plug-ins that may be tailored to specific online communities.

Online communities may be synchronized automatically and periodically or at the request of a user. A graphical user interface that allows a user to specify or modify login information, community-access settings, and/or community-synchronization settings for online communities may also be provided. Corresponding systems and computer-readable media for synchronizing online communities are also provided.

Features from any of the above-mentioned or below-described embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
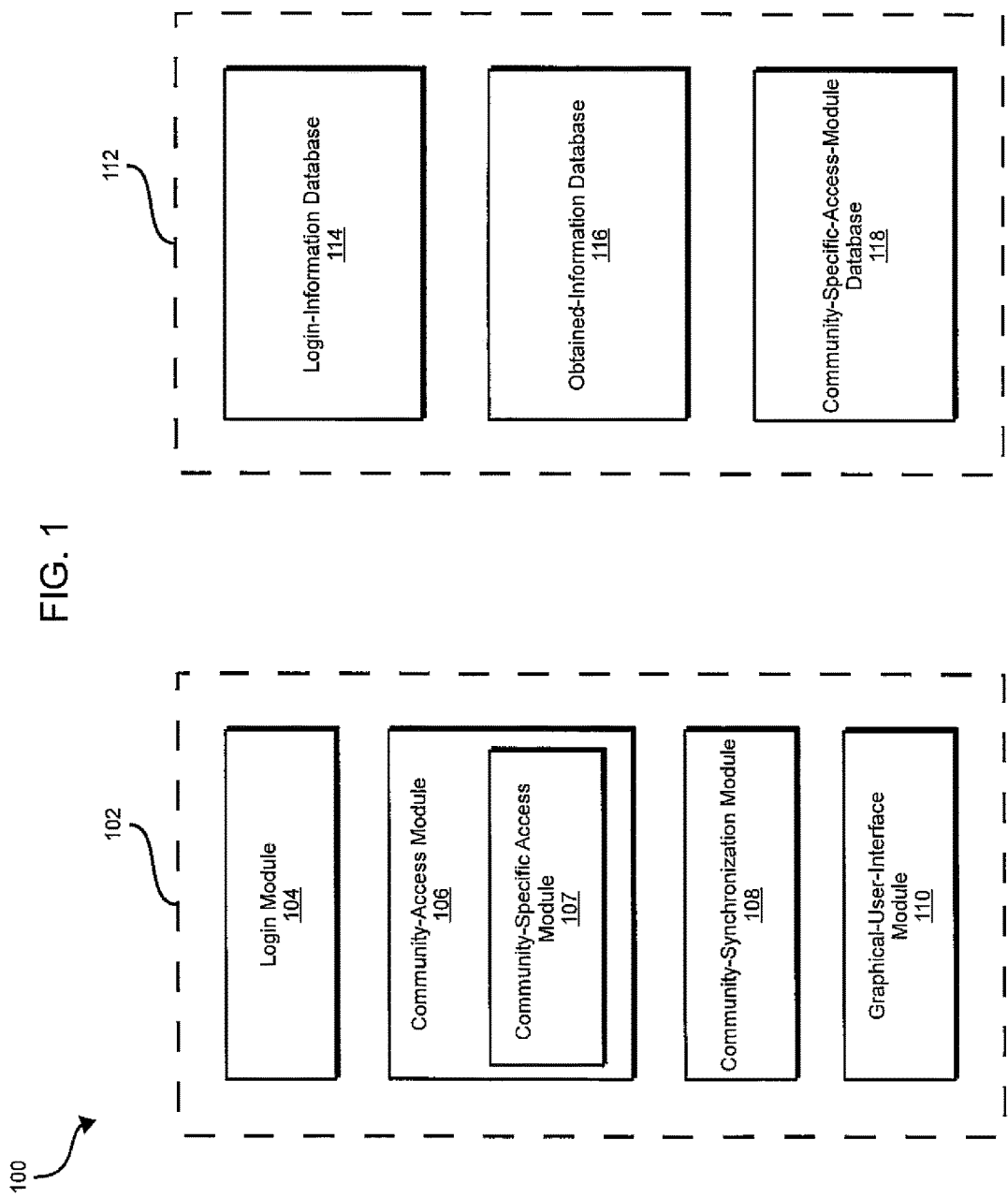
FIG. 1 is a block diagram of an exemplary system for automatically synchronizing online communities according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure relates generally to computer-implemented methods and systems for synchronizing online communities. For example, as will be described in greater detail below, the systems and methods described and/or illustrated herein may enable a user to create or update a second online community based on data or information obtained from a first online community. As detailed above, the phrase "online community" generally refers to any virtual community. Examples of online communities include, without limitation, social and professional-networking websites (such as LINKEDIN, FACEBOOK, and MYSPACE), web-based email services (such as YAHOO! and GMAIL), contact-management services (such as PLAXO), newsgroups, Internet forums (such as message boards), blogs, instant-messaging services, peer-to-peer communities, or any other virtual community.

FIG. 1 is an illustration of an exemplary system 100 for automatically synchronizing online communities. As used herein, and as will be explained in greater detail below, the term "synchronize" may generally refer to creating, updating, or modifying online communities based information obtained from additional online communities. As illustrated in FIG. 1, exemplary system 100 may comprise one or more modules 102 for performing one or more tasks required to automatically synchronize online communities. For example, exemplary system 100 may comprise a login module 104 for managing login information for user accounts for online communities, a community-access module 106 for accessing and obtaining information from user accounts for online communities, and a community-synchronization module 108 for synchronizing user accounts for online communities. Exemplary system 100 may also comprise a graphical-user-interface module 110 for providing a graphical user interface that allows users to specify or modify login information, community-access settings, and/or community-synchronization settings for online communities. In certain embodiments, and as will be described in greater detail below, community-access module 106 may comprise one or more community-specific access modules or plug-ins 107 that are specifically configured to provide access to specific online communities.

As illustrated in FIG. 1, exemplary system 100 may also comprise one or more databases 112. For example, exemplary system 100 may comprise a login-information database 114 for storing login information for user accounts for online communities, an obtained-information database 116 for storing information obtained from online communities, and a community-specific-access-module database 118 for storing community-specific access modules, such as community-specific access module 107. Although illustrated as separate devices, one or more of databases 112 may represent portions of a single database or a single computing device.

In certain embodiments, one or more of modules 102 may represent one or more software applications or programs that, when executed by a computing device, may cause the computing device to perform one or more tasks required to automatically synchronize online communities. For example, as will be described in greater detail below, one or more of modules 102 may represent software modules configured to run on one or more computing devices, such as computing device 202 in FIG. 2, client 302 in FIG. 3, or server 310 in FIG. 3. One or more of modules 102 may also represent all or portions of one or more special-purpose computers configured to perform one or more tasks necessary to automatically synchronize online communities.

In addition, one or more of databases 112 may represent a portion of one or more computing devices. For example, login-information database 114, obtained-information database 116, and/or community-specific-access-module database 118 may represent a portion of a computing device, such as computing device 202 in FIG. 2, client 302 in FIG. 3, and/or server 310 in FIG. 3. Alternatively, one or more of databases 112 may represent one or more physically separate devices capable of being accessed by a computing device, such as computing device 202 in FIG. 2, client 302 in FIG. 3, or server 310 in FIG. 3.

Figure 2:
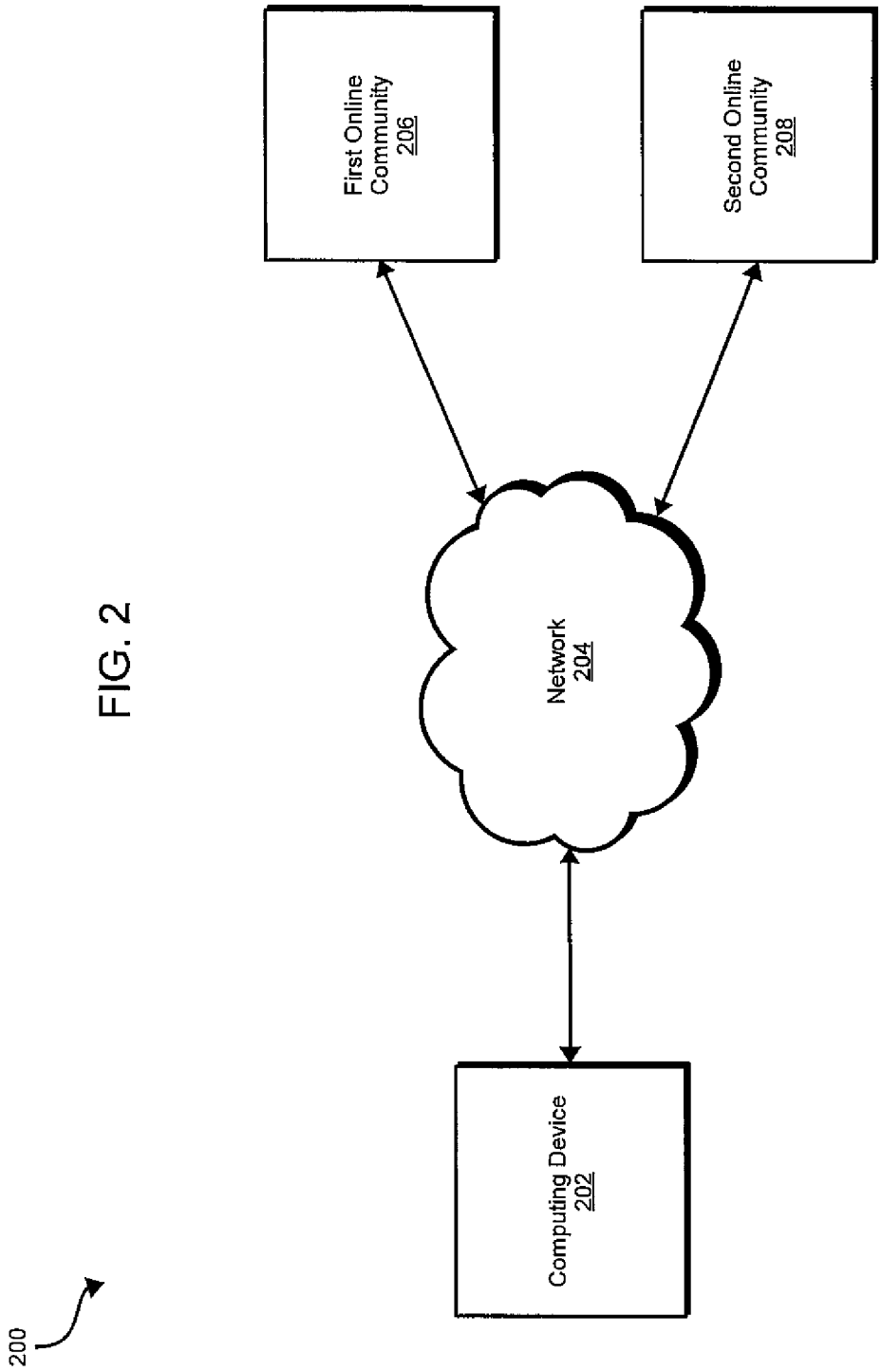
FIG. 2 is a block diagram of an exemplary client-based system for automatically synchronizing online communities according to certain embodiments.

Exemplary system 100 in FIG. 1 may be deployed in a variety of ways. For example, all or a portion of exemplary system 100 may represent portions of a client-based system or a network-based system. FIG. 2 is an illustration of an exemplary client-based system 200 for automatically synchronizing online communities. As illustrated in this figure, system 200 may comprise a computing device 202 in communication with a first online community 206 and a second online community 208 via a network 204.

Computing device 202 generally represents any type or form of device capable of executing computer-readable instructions. A detailed description of an exemplary computing device is provided below in connection with FIG. 9. In certain embodiments, computing device 202 may comprise one or more portions of exemplary system 100 in FIG. 1. For example, one or more of modules 102 from FIG. 1 may be stored and configured to run on computing device 202. Similarly, computing device 202 may comprise one or more of databases 112 in FIG. 1.

In at least one embodiment, computing device 202 may communicate with first online community 206 and second online community 208 via network 204. Network 204 generally represents any type of communication or computing network; including, for example, an intranet, a wide area network (WAN), a local area network (LAN), a personal area network (PAN), or the Internet.

First online community 206 and second online community 208 generally represent any type or form of online community. Examples of first and second online communities 206 and 208 include, without limitation, social and professional-networking websites (such as LINKEDIN, FACEBOOK, and MYSPACE), web-based email services (such as YAHOO! and GMAIL), contact-management services (such as PLAXO), newsgroups, Internet forums (such as message boards), blogs, instant-messaging services, peer-to-peer communities, or any other virtual community.

Although not illustrated, in certain embodiments first online community 206 and second online community 208 may comprise at least one computing device (such as a server) for facilitating communication between one or more client-side terminals operated by one or more users of the online communities. First online community 206 and second online community 208 may also comprise one or more databases for storing user-account data. The phrase "user-account data" generally refers to data associated with a user or a participant in an online community. Examples of the type of data that may be associated with a user in an online community include, without limitation, user-login information, user-account-settings information, contact records containing contact information for friends, family members, or acquaintances of a user, or any other form of data, such messages posted, sent, or received by a user.

As will be described in greater detail below, exemplary system 200 may enable a user of a plurality of online communities, such as first online community 206 and second online community 208, to synchronize user accounts, or data associated with the user accounts, in each of the online communities in which the user is a participant. For example, as will be described in greater detail below, a user may, by using computing device 202 in FIG. 2, synchronize a first user account associated with first online community 206 with a second user account associated with second online community 208. Exemplary system 200 may also enable a user of a first online community, such as first online community 206, to automatically create and update a user account in a second online community, such as second online community 208, based on information obtained from the first online community.

Figure 3:
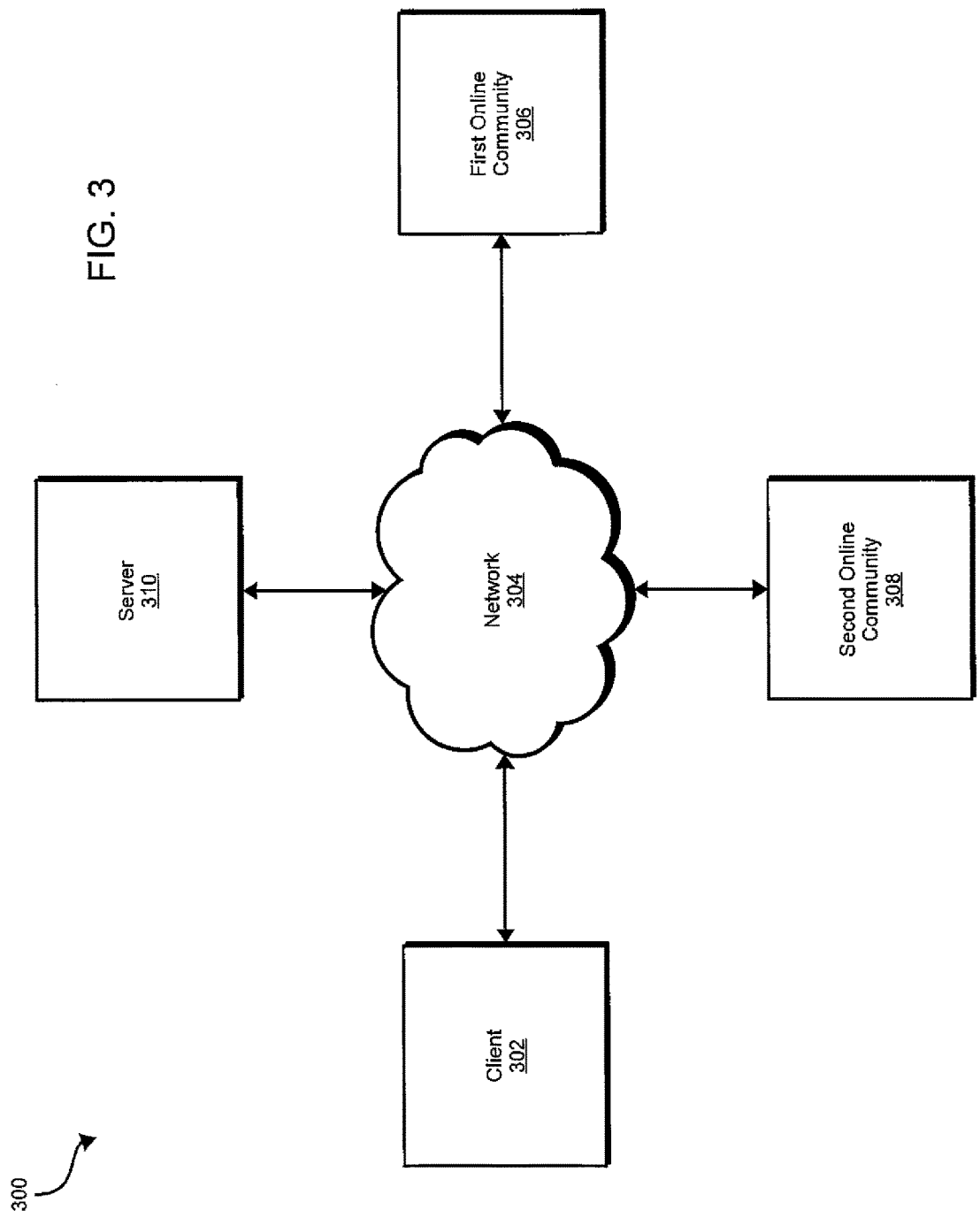
FIG. 3 is a block diagram of an exemplary network-based system for automatically synchronizing online communities according to certain embodiments.

As detailed above, in certain embodiments all or a portion of exemplary system 100 in FIG. 1 may also be deployed within a network-based system. FIG. 3 is an illustration of an exemplary network-based system 300 for automatically synchronizing online communities. As illustrated in this figure, exemplary system 300 may comprise a client computing device 302 in communication with a first online community 306, a second online community 308, and a server computing device 310 via a network 304. Client 302 generally represents any type or form of client-side computing device. Similarly, server 310 generally represents any type or form of server-side computing device.

In certain embodiments, server 310 may comprise one or more portions of exemplary system 100 in FIG. 1. For example, one or more of modules 102 from FIG. 1 may be stored and configured to run on server 310. Similarly, server 310 may comprise one or more of databases 112 in FIG. 1. In this embodiment, a user of client 302 may perform one or more synchronization tasks by accessing server 310 via network 304. For example, as will be described in greater detail below, server 310 may, either automatically or upon receiving a request from client 302, synchronize a first user account associated with first online community 306 with a second user account associated with second online community 308. Exemplary system 300 may also enable a user of a first online community, such as first online community 306, to automatically create and update a new user account for a second online community, such as second online community 308, based on information obtained from the first online community. For example, as will be described in greater detail below, server 310 may, either automatically or upon receiving a request from client 302, create and update a new user account for second online community 308 based on information obtained from first online community 306.

Figure 4:
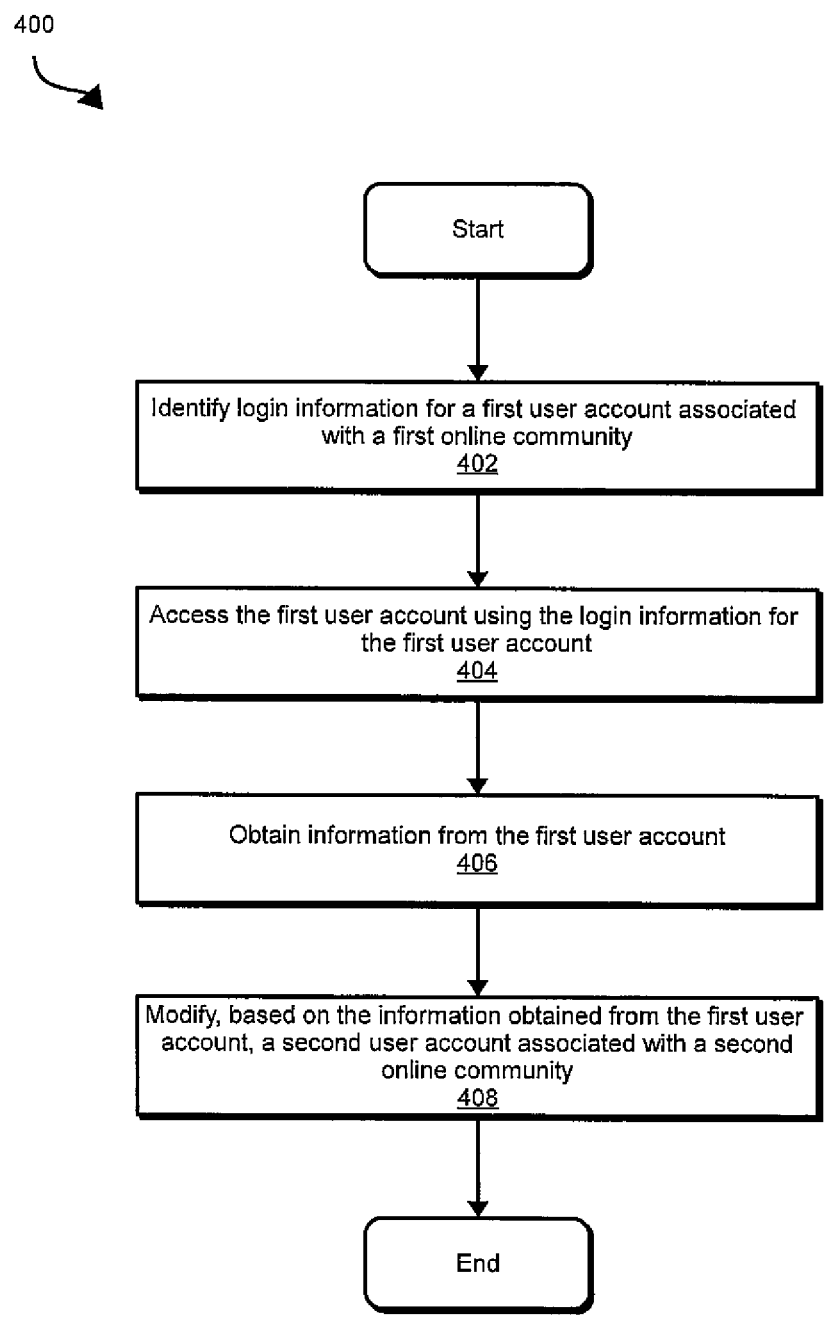
FIG. 4 is a flow diagram of an exemplary computer-implemented method for automatically synchronizing online communities according to at least one embodiment.

FIG. 4 is a flow diagram of an exemplary computer-implemented method 400 for synchronizing online communities. As will be explained in greater detail below, in this embodiment a second user account associated with a second online community may be modified (that is, created or updated) based on information obtained from a first user account associated with a first online community. For example, as illustrated in FIG. 4, at step 402 a computing device (such as computing device 202 in FIG. 2, client 302 in FIG. 3, or server 310 in FIG. 3) may identify login information for a first user account associated with a first online community, such as first online community 206 in FIG. 2 or first online community 306 in FIG. 3.

Login information for a user account may be identified in any number of ways. For example, in certain embodiments a computing device may identify login information for a first user account by locating and retrieving, using a login module such as login module 104 in FIG. 1, the login information for the first user account from a login-information database, such as login-information database 114 in FIG. 1. In an alternative embodiment, login information may be identified at step 402 by receiving the login information for the first user account from a user.

At step 404, the computing device may access the first user account using the login information for the first user account. User accounts may be accessed in a variety of ways. For example, in certain embodiments accessing the first user account may comprise logging in to the first user account using the login information for the first user account. In certain embodiments, a community-access module, such as community-access module 106 in FIG. 1, may be used to access user accounts. User accounts may also be accessed using community-specific access modules, such as community-specific access module 107 in FIG. 1, as will be explained in greater detail below in connection with FIG. 6.

At step 406, the computing device may obtain information from the first user account associated with the first online community. Any type or form of information or data may be obtained from the first user account in step 406; including, for example, both computer-readable and human-readable data. This information or data may also be obtained in a variety of ways. In one embodiment, computer-readable data may be received from a first online community in response to a request transmitted by a computing device. For example, community-access module 106 may, using computing device 202, instruct first online community 206 to export computer-readable data from a first user account associated with first online community 206 to computing device 202.

Data may also be obtained from online communities by "screen scraping" or extracting data from a display output of the online community. For example, community-access module 106 may, using computing device 202: 1) identify data displayed in human-readable form by first online community 206, 2) screen scrape or extract this human-readable data from first online community 206, 3) convert this human-readable data into computer-readable data, and then 4) store this computer-readable data in obtained-information database 116.

In at least one embodiment, obtaining information from the first user account may comprise obtaining user-account data associated with the first user account of the first online community. As detailed above, examples of user-account data may include, without limitation, user-login information, user-account-settings information, contact records containing contact information for friends, family members, or acquaintances of a user, or any other form of data, such as messages posted, sent, or received by a user. The phrase "contact record" may generally refer to a data record containing contact information for a friend, family member, or acquaintance of a user. Examples of the type of contact information that may be contained in a contact record include, without limitation, contact-identification information (such as the name of a friend, family member, or acquaintance), an email address for a contact, a phone number for a contact, a fax number for a contact, a mailing address for a contact, a website address for a contact, an instant-messaging address for a contact, or any other useful information.

At step 408, the computing device may modify, based on the information obtained from the first user account in step 406, a second user account associated with a second online community. For example, as illustrated in FIG. 2, computing device 202 may access and then modify, based on information obtained from first online community 206, second online community 208 using community-access module 106 in FIG. 1. Similarly, server 310 in FIG. 3 may modify, based on information obtained from first online community 306, second online community 308 using community-access module 106. In certain embodiments, exemplary method 400 may also comprise, prior to modifying the second user account in step 408, comparing the information obtained from the first user account in step 406 with information obtained from the second user account to identify unique or duplicative information. In this embodiment, step 406 may comprise modifying the second user account based on the new information identified. In at least one embodiment, this comparison may be performed by community-synchronization module 108 in FIG. 1.

User accounts may be modified in a variety of ways. For example, in certain embodiments modifying the second user account may comprise editing, based on information obtained from the first user account, at least one preexisting contact record associated with the second user account, creating, based on the information obtained from the first user account, at least one new contact record for the second user account, and/or deleting at least one contact record in the second user account. Modifying a second user account may also refer to creating a second user account for a second online community. For example, modifying the second user account in step 408 may comprise creating, based on user-account information obtained from a first user account associated with first online community 206, a second (i.e., new) user account for second online community 208 and then creating, based on contact information obtained from the first user account, at least one new contact record for the second user account.

In at least one embodiment, upon creating a new contact record for the second user account, (which may, as described above, represent a new user account or an existing user account that has been modified), the computing device may also send an invitation to join the second online community to a friend, family member, or acquaintance of the user. In this embodiment, modifying a second user account may comprise creating, based on information obtained from a first user account, at least one new contact record for a second user account associated with a second online community and then sending, via the second online community, an invitation to join the second online community to a user associated with the new contact record. For example, computing device 202 in FIG. 2 may create, based on information obtained from a first user account associated with first online community 206, a contact record for a second user account associated with second online community 208, access the second user account, and then send, via second online community 208, an invitation to join the second online community to a user associated with the new contact record. Invitations to join an online community may be sent automatically or at the request of a user. In each of these embodiments, community-access module 106, community-specific access module 107, and/or community-synchronization module 108 may be used to access the user account, modify the user account, and/or send invitations to join the online community. Upon completion of step 408, exemplary method 400 may terminate.

For the sake of clarity, and by way of example only, the following detailed description will provide, with reference to FIGS. 1, 2, and 4, an illustration of how exemplary method 400 may be implemented. In this example, computing device 202 may be a user's personal computer, first online community 206 may be a first social-networking site (such as MYSPACE), and second online community 208 may be a second social-networking site (such as FACEBOOK). In this example, exemplary method 400 may be used to transfer contact records from a first user account associated with first online community 206 to a second user account associated with the second online community 208. One or more of modules 102 in FIG. 1 may be installed and configured to run on computing device 202, which also comprise one or more of databases 112.

In this example, at step 402 in method 400 computing device 202 may identify login information for the first user account associated with first online community 206. For example, login module 104 may cause computing device 202 to search login-information database 114 in FIG. 1 for the username and password for the first user account associated with first online community 206.

After identifying login information for the first user account associated with first online community 206, at step 404 community-access module 106 and/or community-specific-access module 107 may cause computing device 202 to access the first user account associated with first online community 206. For example, computing device 202 may log into the first user account associated with first online community 206 using the username and password for the first user account obtained from login-information database 114.

At step 406 in the current example, community-access module 106 and/or community-specific access module 107 may cause computing device 202 to obtain information from the first user account. For example, computing device 202 may retrieve all contact records associated with the first user account from first online community 206. These contact records may, as previously described, contain contact information, such as names, email addresses, phone numbers, or physical addresses, for friends, family members, or acquaintances of the user.

At step 408, computing device 202 may modify, based on the information obtained from the first user account, the second user account associated with second online community 208. For example, community-access module 106 and/or community-synchronization module 108 may cause computing device 202 to access and create new contact records for the second user account based on the contact records retrieved from the first user account. Upon creating these new contact records for the second user account, community-access module 106, community-specific access module 107, and/or community-synchronization module 108 may cause computing device 202 to access the second user account and send, via second online community 208, an invitation to join second online community 208 to the friends, family, or acquaintances of the user that are associated with each of these new contact records. Upon completion of step 408, exemplary method 400 may terminate.

Figure 5:
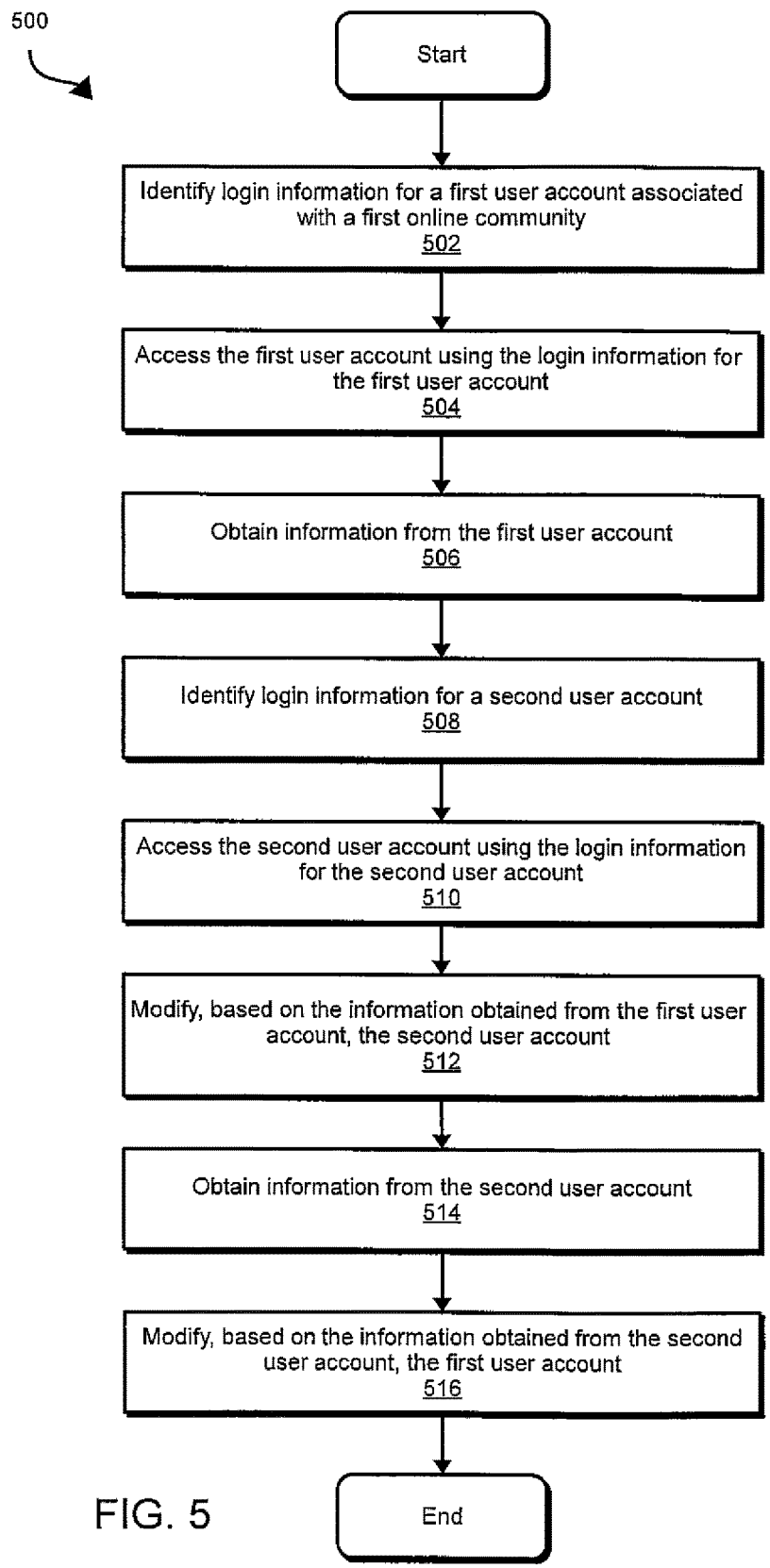
FIG. 5 is a flow diagram of an exemplary computer-implemented method for automatically synchronizing online communities according to an additional embodiment.

In certain embodiments, exemplary system 100 may modify a plurality of user accounts based on information obtained from one or more user accounts. FIG. 5 is a flow diagram of an exemplary computer-implemented method 500 for synchronizing online communities according to an additional embodiment in which a plurality of user accounts may be modified based on information obtained from one or more user accounts. As illustrated in this figure, at step 502 a computing device may identify login information for a first user account associated with the first online community. At step 504, the computing device may access the first user account using the login information for the first user account. At step 506, the computing device may obtain information from the first user account.

At step 508, the computing device may identify login information for a second user account. At step 510, the computing device may access the second user account using the login information for the second user account. At step 512, the computing device may modify, based on the information obtained from the first user account, the second user account.

At step 514, the computing device may obtain information from the second user account. At step 516, the computing device may modify, based upon the information obtained from the second user account, the first user account. Upon completion of step 516, the exemplary method 500 may terminate.

As detailed above, in certain embodiments online communities may be accessed using community-specific access modules, such as community-specific access modules 107 in FIG. 1. The phrase "community-specific access modules" may generally refer to modules that are specifically tailored to perform various community-specific functions. For example, a community-specific access module may be configured to access (e.g., login), retrieve information from (e.g., screen scrape), or add information to specific online communities. In certain embodiments, the various functionalities performed by community-specific access modules 107 may be mapped to a simple interface operated by community-access module 106, which functionalities may be called as needed by community-access module 106, to normalize the actions performed by community-access module 106. For example, community-access module 106 may, when accessing a certain social-networking site, call a community-specific access module 107 especially configured to log into this specific social-networking site. Examples of community-specific access modules may include, without limitation, plug-ins, specialized application programs, or the like. Community-specific access modules 107 may either form a portion of, or be called by, community-access module 106.

Figure 6:
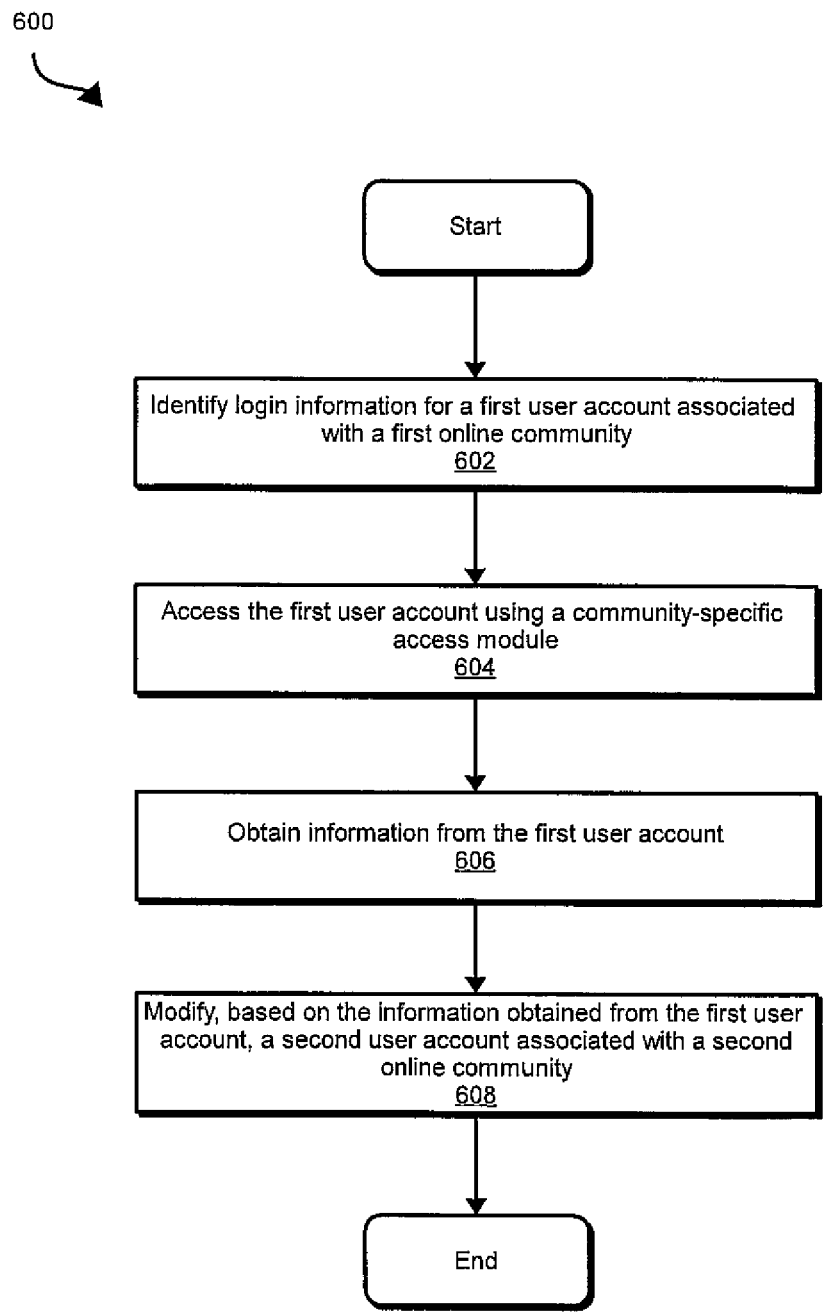
FIG. 6 is a flow diagram of an exemplary computer-implemented method for automatically synchronizing online communities according to an additional embodiment.

FIG. 6 is a flow diagram of an exemplary computer-implemented method 600 for synchronizing online communities using community-specific access modules. As illustrated in this figure, at step 602 a computing device may identify login information for a first user account associated with the first online community. At step 604, the computing device may access the first user account using a community-specific access module. For example, computing device 202 in FIG. 2 may access first online community 206 using community-specific access module 107 in FIG. 1, which may, as detailed above, be specifically tailored to access and retrieve information from first online community 206.

At step 606, the computing device may obtain information from the first user account. At step 608, the computing device may modify, based on the information obtained from the first user account, a second user account associated with the second online community. Upon completion of step 608, exemplary method 600 may terminate.

Figure 7:
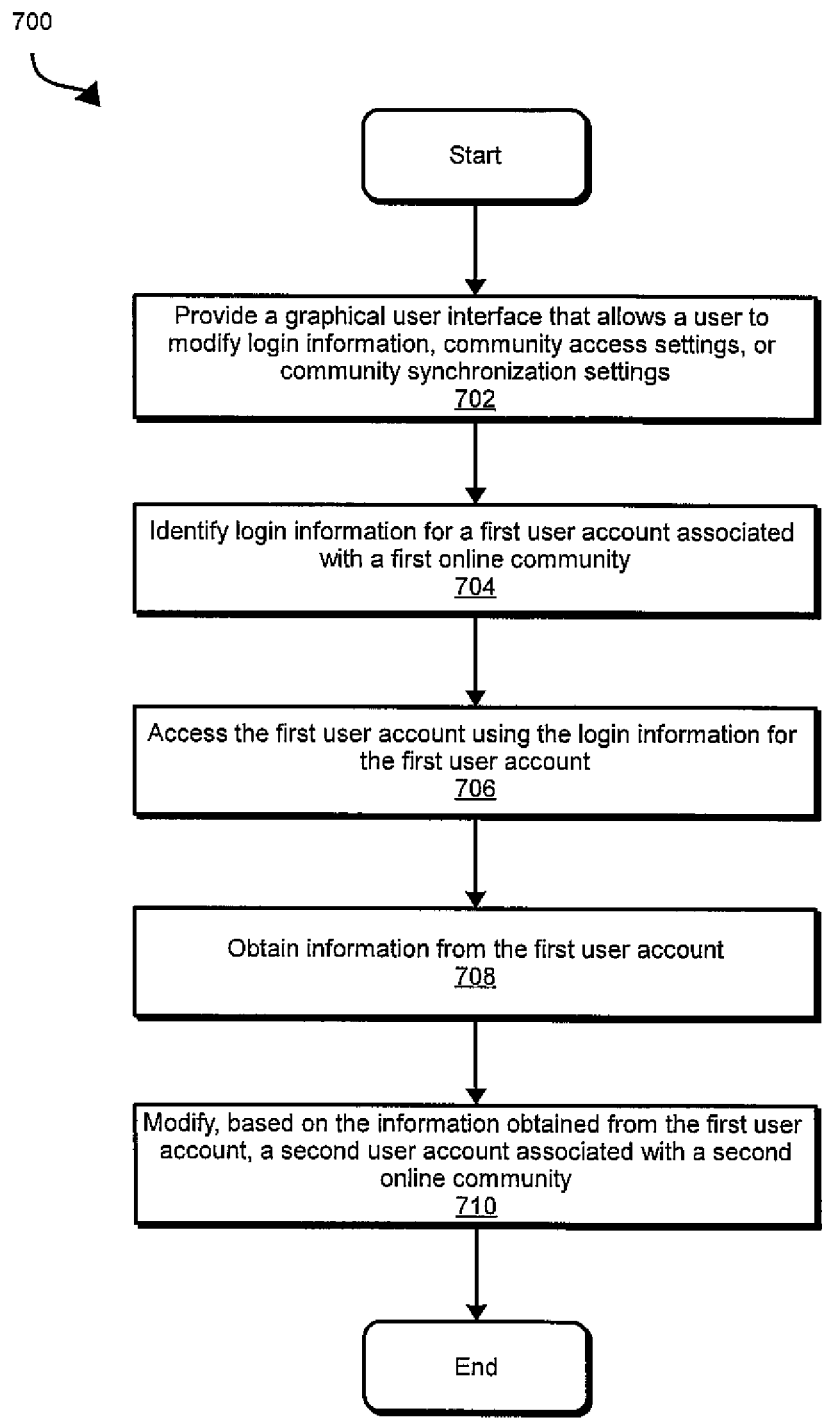
FIG. 7 is a flow diagram of an exemplary computer-implemented method for automatically synchronizing online communities according to an additional embodiment.

As detailed above, a graphical-user-interface module, such as graphical-user-interface module 110 in FIG. 1, may provide a graphical user interface that allows a user to modify one or more community-access or synchronization settings. FIG. 7 is a flow diagram of an exemplary computer-implemented method 700 for synchronizing online communities using a graphical user interface. As illustrated in this figure, at step 702 a computing device may provide a graphical user interface that allows a user to modify one or more settings, such as login information for a user account, community-access settings for one or more online communities, community-synchronization settings associated with online communities, or the like. For example, this graphical user interface may enable a user to input login information (such as usernames and passwords) for a user account associated with an online community, create a new user account for an online community based on a preexisting user account for an online community, manually initiate automatic synchronization between two or more online communities, specify that synchronization between communities is to be initiated automatically and periodically, specify the frequency with which online communities are to be synchronized, specify which of a plurality of online communities are to be synchronized, or the like.

At step 704, the computing device may identify login information for a first user account associated with the first online community. At step 706, the computing device may access the first user account using the login information for the first user account. At step 708, the computing device may obtain information from the first user account. At step 710, the computing device may modify, based on the information obtained from the first user account, a second user account associated with the second online community. Upon completion of step 710, exemplary method 700 may terminate.

Figure 8:
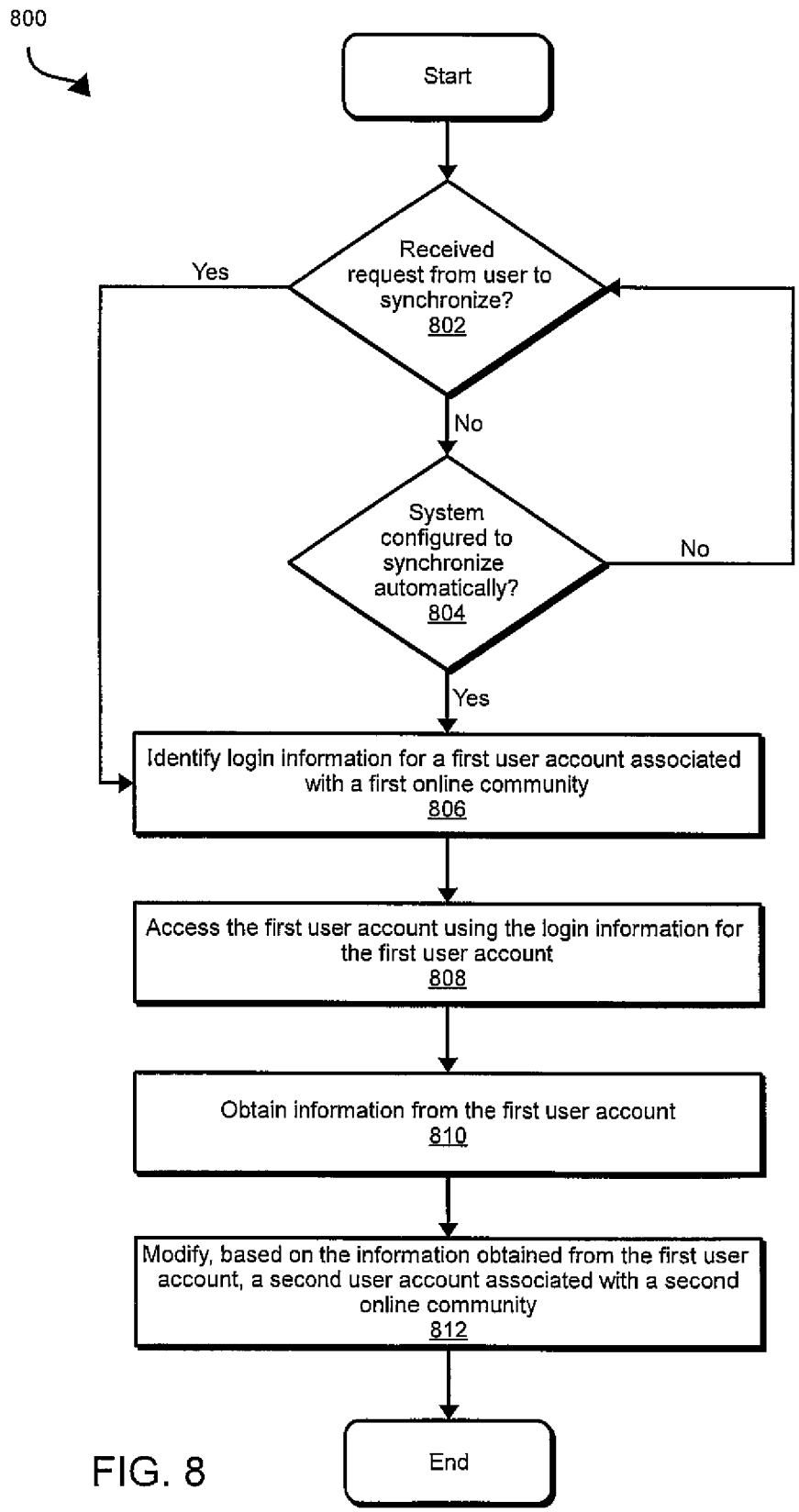
FIG. 8 is a flow diagram of an exemplary computer-implemented method for automatically synchronizing online communities according to an additional embodiment.

As detailed above, the exemplary methods described and/or illustrated herein may be initiated automatically or upon receiving a request from a user. FIG. 8 is a flow diagram of an exemplary computer-implemented method 800 for synchronizing online communities that may be initiated either automatically or upon receiving a request from a user. As illustrated in this figure, at step 802 the computing device may determine whether it has received a request from a user to synchronize online communities. If the computing device has received a request from a user to synchronize online communities, control proceeds to step 806. Otherwise, control proceeds to step 804.

At step 804, the computing device may determine whether it has been configured to automatically synchronize online communities. For example, a computing device, such as computing device 202 in FIG. 2, may determine, by retrieving community-access settings, whether a user has requested that the synchronization of two or more online communities be initiated periodically and automatically. If at step 804 the computing device determines that it has been configured to automatically synchronize online communities, control proceeds to step 806. Otherwise, control returns to step 802.

At step 806, the computing device may identify login information for a first user account associated with the first online community. At step 808, the computing device may access the first user account using the login information for the first user account. At step 810, the computing device may obtain information from the first user account. At step 812, the computing device may modify, based on the information obtained from the first user account, a second user account associated with the second online community. Upon completion of step 812, exemplary method 800 may terminate.

Figure 9:
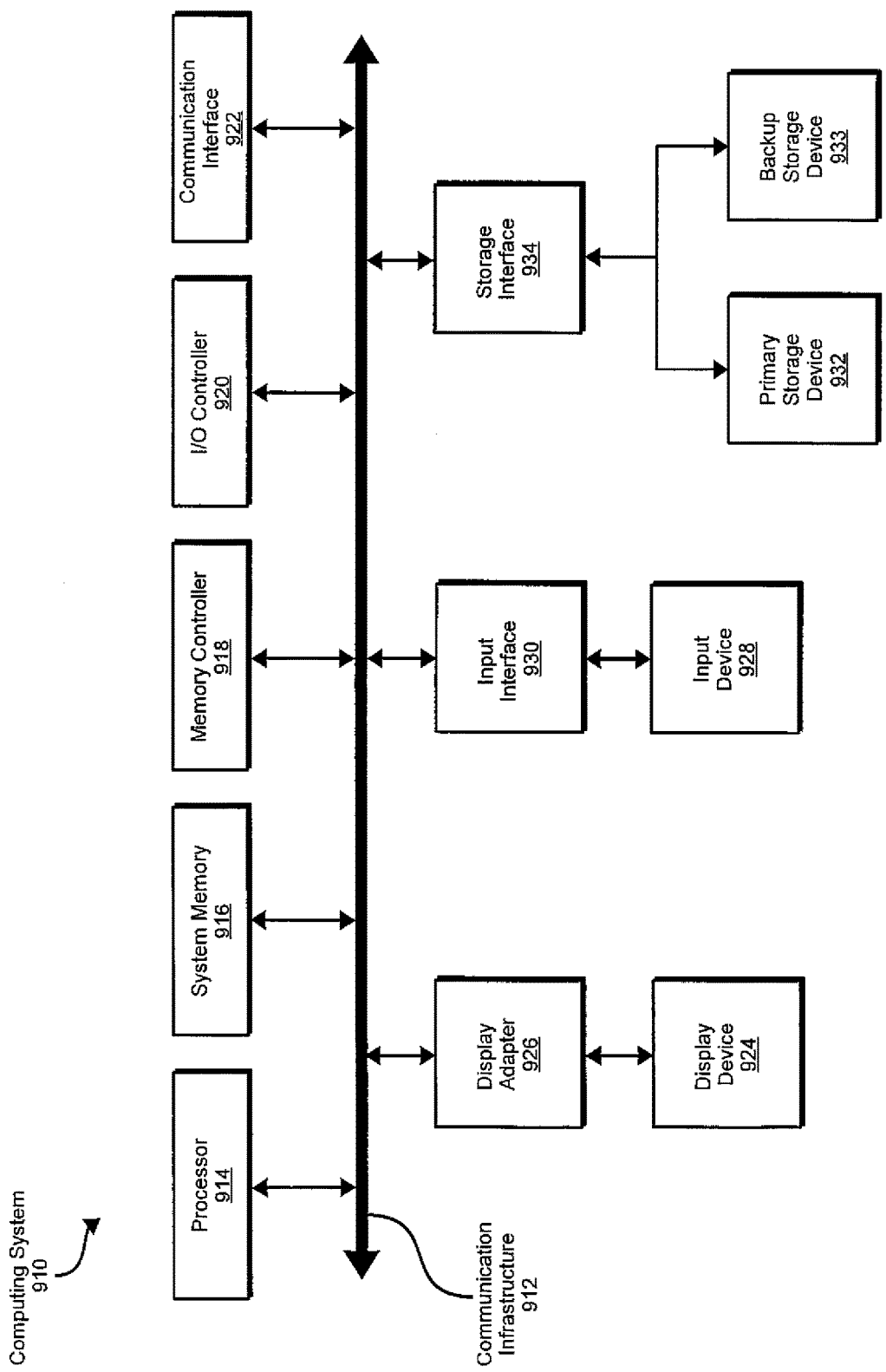
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device; including, for example, computing device 202 in FIG. 2, client 302 in FIG. 3, and server 310 in FIG. 3.

In its most basic configuration, computing system 910 may comprise at least one processor 914 and a system memory 916. Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the identifying, accessing, obtaining, modifying, receiving, retrieving, extracting, editing, creating, deleting, transmitting, or providing steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may comprise both a volatile memory unit (such as, for example, system memory 916) and a non-volatile storage device (such as, for example, primary storage device 932, as described in detail below).

In certain embodiments, exemplary computing system 910 may also comprise one or more components or elements in addition to processor 914 and system memory 916. For example, as illustrated in FIG. 9, computing system 910 may comprise a memory controller 918, an Input/Output (I/O) controller 918, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller may perform and/or be a means for performing, either alone or in combination with other elements, one or more of the steps or features described and/or illustrated herein, such as identifying, accessing, obtaining, modifying, receiving, retrieving, extracting, editing, creating, deleting, transmitting, or providing.

I/O controller 920 generally represents any type or form of module capable of coordinating and/or controlling the input and output functions of a computing device. For example, in certain embodiments I/O controller may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for performing, either alone or in combination with other elements, one or more of the identifying, accessing, obtaining, modifying, receiving, retrieving, extracting, editing, creating, deleting, transmitting, or providing steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network comprising additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the identifying, accessing, obtaining, modifying, receiving, retrieving, extracting, editing, creating, deleting, transmitting, or providing steps disclosed herein. Communication interface 922 may also be used to perform and/or be a means for performing other steps and features set forth in the instant disclosure.

As illustrated in FIG. 9, computing system 910 may also comprise at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also comprise at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the identifying, accessing, obtaining, modifying, receiving, retrieving, extracting, editing, creating, deleting, transmitting, or providing steps disclosed herein. Input device 928 may also be used to perform and/or be a means for performing other steps and features set forth in the instant disclosure.

As illustrated in FIG. 9, exemplary computing system 910 may also comprise a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also comprise other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

In certain embodiments, the exemplary file systems disclosed herein may be stored on primary storage device 932, while the exemplary file-system backups disclosed herein may be stored on backup storage device 933. Storage devices 932 and 933 may also be used, for example, to perform and/or be a means for performing, either alone or in combination with other elements, one or more of the identifying, accessing, obtaining, modifying, receiving, retrieving, extracting, editing, creating, deleting, transmitting, or providing steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments descried and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, or medium capable of storing or carrying computer-readable instructions. Examples of computer-readable media include, without limitation, physical media such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application-specific integrated circuit (ASIC) adapted to implement one or more of the exemplary embodiments disclosed herein.

Figure 10:
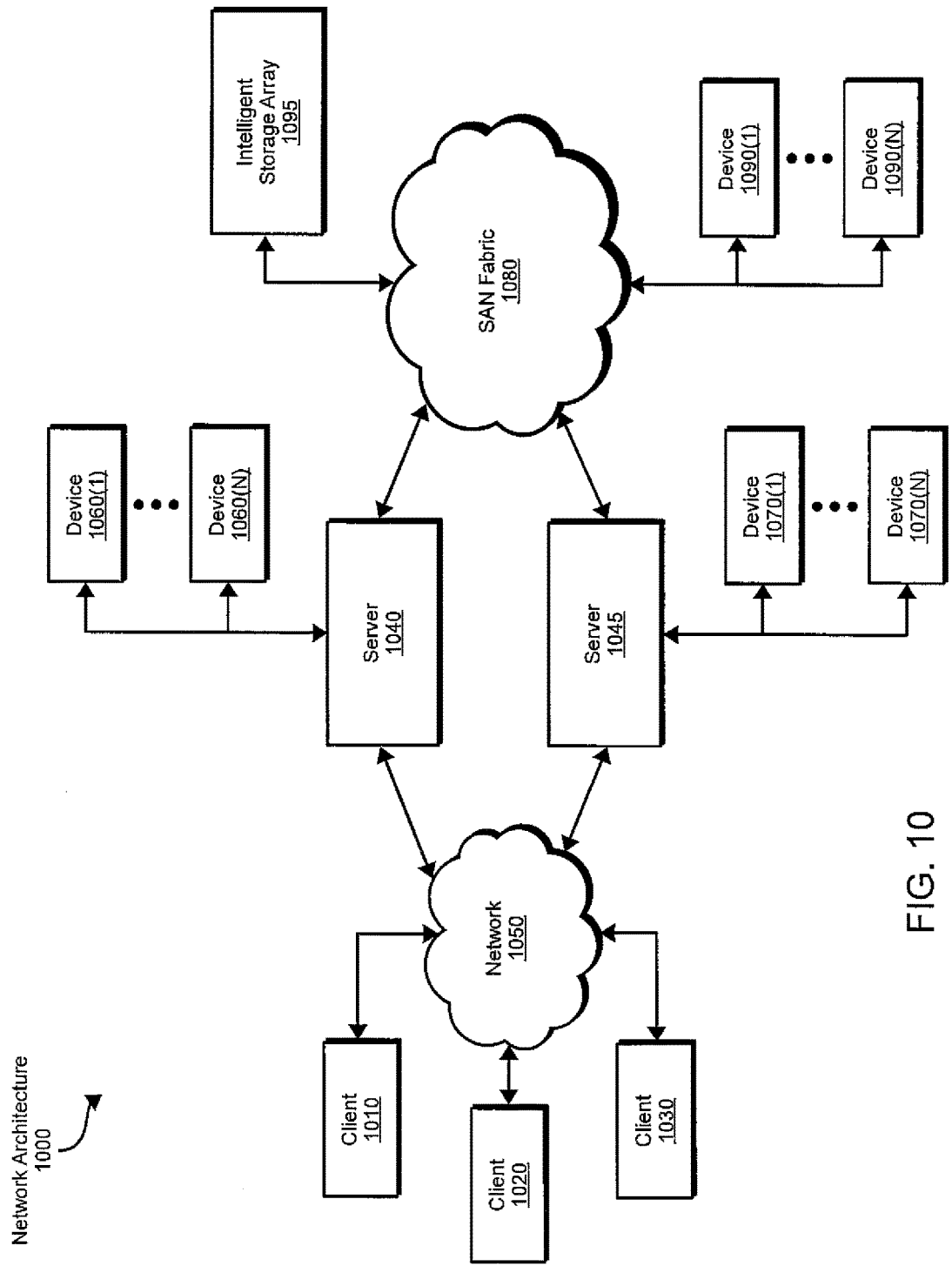
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or to run certain software applications. Network 1050 generally represents any telecommunication or computer network; including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1090(1)-(N) may be directly attached to server 1045. Storage devices 1060(1)-(N) and storage devices 1090(1)-(N) generally represent any type or form of storage device or medium capable of storing data and/or other computer-readable instructions. In certain embodiments, storage devices 1060(1)-(N) and storage devices 1090(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1050, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 822 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing, either alone or in combination with other elements, one or more of the identifying, accessing, obtaining, modifying, receiving, retrieving, extracting, editing, creating, deleting, transmitting, or providing steps disclosed herein. Network architecture 1000 may also be used to perform and/or be a means for performing other steps and features set forth in the instant disclosure.

As detailed above, computing system 910 in FIG. 9 and/or one or more of the components of network architecture 1000 in FIG. 10 may perform and/or be a means for performing, either alone or in combination with other elements, one or more of the exemplary methods described and/or illustrated herein. In one embodiment, this exemplary computer-implemented method may comprise identifying login information for a first user account associated with the first online community, accessing the first user account using the login information from the first user account, obtaining information from the first user account, and modifying, based on the information obtained from the first user account, a second user account associated with the second online community.

In some embodiments, identifying the login information for the first user account may comprise receiving the login information for the first user account from a user or retrieving the login information from the first user account from a login-information database. The method may further comprise, prior to modifying the second user account associated with the second online community, identifying login information for the second user account and accessing the second user account using the login information for the second user account. The method may also further comprise obtaining information from the second user account and modifying, based on the information obtained from the second user account, the first user account.

In certain embodiments, accessing the first user account may comprise logging in to the first user account using the login information for the first user account. Accessing the first user account may also comprise accessing the first user account using a community-specific access module. In addition, obtaining information from the first user account may comprise receiving computer-readable data or extracting human-readable data.

In at least one embodiment, the information obtained from the first user account may comprise user-account data. The user-account data obtained from the first user account may also comprise at least one contact record containing contact information, which may comprise contact-identification information (such as a name), an email address, a phone number, a fax number, a mailing address, a website address, or an instant-messaging address.

In certain embodiments, modifying the second user account may comprise deleting at least one contact record or editing, based on the information obtained from the first user account, at least one preexisting contact record. Modifying the second user account may also comprise creating, based on information obtained from the first user account, at least one new contact record and sending, via the second online community, an invitation to join the second online community to a user associated with the at least one new contact record. In addition, modifying the second user account may comprise creating a new user account for the second online community, creating, based on the information obtained from the first user account, at least one new contact record for the new user account, and sending, via the second online community, an invitation to join the second online community to a user associated with the at least one new contact record.

In some embodiments, the method may also comprise providing a graphical user interface that allows a user to modify login information, community access settings, community synchronization settings, or the like. The method may also comprise modifying, based on the information obtained from the first user account, a third user account associated with a third online community. In addition, the method may further comprise, prior to accessing the first user account, receiving a request from a user to synchronize the first user account with the second user account.

Computing system 910 and/or one or more of the components of network architecture 1000 may also represent all or portions of exemplary system 100 in FIG. 1. For example, computing system 910 and/or one or more of the components of network architecture 1000 may represent all or portions of a system for automatically synchronizing online communities, which system may comprise a login module for managing login information for at least a first user account associated with the first online community, a community-access module for accessing the first user account using the login information for the first user account, and obtaining information from the first user account, and a community synchronization module for modifying, based on the information obtained from the first user account, a second user account associated with the second online community.

In certain embodiments, the community-access module may further comprise at least one community-specific access module. In addition, the system may further comprise a graphical-user-interface module for providing a graphical user interface that allows a user to modify login information, community access settings, or synchronization settings.

The system may also comprise a login-information database for storing login information for user accounts associated with online communities, an obtained-information database for storing information obtained from online communities, and a community-specific-access-module database for storing community-specific access modules.

As detailed above, all or portions of exemplary system 100 in FIG. 1 (such as modules 102) may represent a software application or program that, when executed by a computing device, may cause the computing device to perform one or more tasks required to automatically synchronize online communities. In this embodiment, all or portions of exemplary system 100 in FIG. 1, such as modules 102, may represent computer-readable media comprising one or more computer-executable instructions that, when executed by a computing device, may cause a computing device to identify login information for a first user account associated with the first online community, access the first user account using the login information for the first user account, obtain information from the first user account, and modify, based on the information obtained from the first user account, a second user account associated with the second online community.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for automatically synchronizing online communities, at least a portion of the method being performed by a computing device comprising at least one processor, the method comprising:
    identifying login information for a user account associated with an online community;
    accessing the user account using the login information for the user account;
    obtaining information from the user account;
    using the information obtained from the user account to automatically and continuously synchronize the user account with at least one additional user account associated with an additional online community that is different from the online community by:
        determining, based on the information obtained from the user account, that at least one contact record associated with the additional user account differs from a corresponding contact record associated with the user account;
        updating the additional user account so that the contact record associated with the additional user account coincides with the corresponding contact record associated with the user account.

2. The method of claim 1, wherein identifying the login information for the user account comprises at least one of:
    receiving the login information for the user account from a user;
    retrieving the login information for the user account from a login-information database.

3. The method of claim 1, further comprising, prior to using the information obtained from the user account to automatically and continuously synchronize the user account with the additional user account:
    identifying login information for the additional user account;
    accessing the additional user account using the login information for the additional user account.

4. The method of claim 3, further comprising:
    obtaining information from the additional user account;
    updating the user account based on the information obtained from the additional user account.

5. The method of claim 1, wherein accessing the user account comprises accessing the user account using a community-specific access module.

6. The method of claim 1, wherein obtaining information from the user account comprises:
    extracting non-computer-readable data from the user account;
    converting the non-computer-readable data into computer-readable data.

7. The method of claim 1, wherein the information obtained from the user account comprises at least one contact record containing contact information for a contact, the contact information comprising at least one of:

contact-identification information;
an email address;
a phone number;
a fax number;
a mailing address;
a website address;
an instant-messaging address.

8. The method of claim 1, wherein updating the additional user account so that the contact record associated with the additional user account coincides with the corresponding contact record associated with the user account comprises at least one of:
creating, based on the information obtained from the user account, the contact record associated with the additional user account;
deleting the contact record associated with the additional user account from the additional user account.

9. The method of claim 1, further comprising:
creating a new user account for a new online community that is different from the online community;
automatically creating, based on the information obtained from the user account, at least one new contact record for the new user account that corresponds to a contact record associated with the user account;
automatically sending, via the additional online community, an invitation to join the new online community to a user associated with the new contact record.

10. The method of claim 1, further comprising providing a graphical user interface that allows a user to modify at least one of:
login information for at least one of the user account and the additional user account;
community-access settings for at least one of the user account and the additional user account;
community-synchronization settings for at least one of the user account and the additional user account.

11. The method of claim 1, further comprising, prior to accessing the user account, receiving a request from a user to synchronize the additional user account with the user account.

12. The method of claim 1, wherein the computer-implemented method is performed periodically.

13. A system for automatically synchronizing online communities, the system comprising:
a login module programmed to manage login information for a user account associated with an online community;
a community-access module programmed to:
access the user account using the login information for the user account;
obtain information from the user account;
a community-synchronization module programmed to use the information obtained from the user account to automatically and continuously synchronize the user account with at least one additional user account associated with an additional online community that is different from the online community by:
determining, based on the information obtained from the user account, that at least one contact record associated with the additional user account differs from a corresponding contact record associated with the user account;
updating the additional user account so that the contact record associated with the additional user account coincides with the corresponding contact record associated with the user account;
at least one processor configured to execute the login module, the community-access module, and the community-synchronization module.

14. The system of claim 13, wherein the community-access module further comprises at least one community-specific access module.

15. The system of claim 13, further comprising a graphical-user-interface module programmed to provide a graphical user interface that allows a user to modify at least one of:
login information for at least one of the user account and the additional user account;
community-access settings for at least one of the user account and the additional user account;
synchronization settings for at least one of the user account and the additional user account.

16. The system of claim 13, further comprising:
a login-information database for storing login information for user accounts associated with online communities;
an obtained-information database for storing information obtained from online communities;
a community-specific-access-module database for storing community-specific access modules.

17. A non-transitory computer-readable medium comprising one or more computer-executable instructions that, when executed by a computing device, cause the computing device to:
identify login information for a user account associated with an online community;
access the user account using the login information for the user account;
obtain information from the user account;
use the information obtained from the user account to automatically and continuously synchronize the user account with at least one additional user account associated with an additional online community that is different from the online community by:
determining, based on the information obtained from the user account, that at least one contact record associated with the additional user account differs from a corresponding contact record associated with the user account;
updating the additional user account so that the contact record associated with the additional user account coincides with the corresponding contact record associated with the user account.

* * * * *